Patented Dec. 22, 1931

1,837,536

UNITED STATES PATENT OFFICE

HENRY L. EASLEY, OF TROY, ILLINOIS

METHOD OF DESICCATING SMEAR-CASE

No Drawing. Application filed June 24, 1929. Serial No. 373,495.

My invention relates to a method of producing desiccated smear-case, and its product.

The primary object of my invention is to provide as a new article of manufacture a dehydrated smear-case in granular form wherein the albumen and lactic acid content is present, and the food value of the original smear-case is unimpaired, which dehydrated material is prepared for the table by the addition of whole milk or cream stirred into and commingled with the mass.

The occasion for the production of this new article of manufacture is the desirability of smear-case as a factor in human diet, and the great difficulty of conveying untreated smear-case to the consumer because of its tendency to sour and become unfit for human consumption, in its transit from the place of production to the place of consumption. A delay of a few hours destroys the original flavor, and any subjection to pasteurization or other preservative process involving subjection to heat is destructive of its food-value, both as to albumen and as to lactic acid.

Accordingly I propose to subject smear-case, as my basic material, and by whatever of the well-known methods of culture produced, to the following treatment.

1. The smear-case is separated from its whey content as completely as possible, either pressure or centrifugal force being employed for that purpose, and the operation being performed in an atmosphere maintained below 60° Fahrenheit. The product is ground to the desired granulation.

2. The albumen and lactic acid are extracted from the whey by any desired method and under the same atmospheric conditions as to temperature; the residue of the whey is discarded.

3. The albumen and lactic acid obtained by Step 2 are restored to the mass of smear-case and thoroughly admixed therewith.

4. The product of Step 3 is dehydrated by agitation in a current of heated air maintained at a range of temperature between 120° F. and 136° F.

The desiccated product is then packaged for storage or shipment. The kind of packaging and the temperature limit of safety in the storage of the finished product is dependent upon the degree of dehydration employed. In local distribution in populous centers it is desirable to stop dehydration at a point where the desiccated product is moderately soft, to the end of ready mixing for table use with milk or cream; while for exportation abroad and long distance shipment, the finished product should be very thoroughly dehydrated, to withstand deterioration from heat in storage.

When desired for use, whole milk or cream is added to the granules, and the moistened mass agitated until it assumes the consistency of the basis smear-case as it was before treatment.

The food value of the product may be maintained at a uniform standard by measuring the albumen and lactic acid, and adding a uniform quantity of each to the granular mass before dehydration. The extent to which the mass is dehydrated will determine its keeping qualities, and the temperature at which it may be stored for predetermined periods of time.

The process thus described is susceptible of some modification and variation without departure from my actual invention, as defined by the appended claims.

I claim:—

1. The process of producing a desiccated smear-case, comprising separating from a quantity of smear-case its whey content and granulating its separated mass, extracting the albumen and the lactic acid from the whey, restoring the albumen and the lactic acid mass and admixing them therewith and dehydrating the product of said last named step by agitation in a current of air.

2. The process of producing a desiccated smear-case, comprising separating from a quantity of smear-case its whey content in an atmosphere maintained below 60° Fahrenheit and granulating its separated mass, extracting the albumen and the lactic acid from the whey, restoring the albumen and the lactic acid mass and admixing them therewith and dehydrating the product of said last named step by agitation in a current of heated air, maintained at a range of temperature between 120° Fahrenheit and 136° Fahrenheit.

In testimony whereof I have hereunto affixed my signature.

HENRY L. EASLEY.